United States Patent
Ng et al.

(10) Patent No.: US 8,029,852 B2
(45) Date of Patent: Oct. 4, 2011

(54) CONTACT PRINTING OXIDE-BASED ELECTRICALLY ACTIVE MICRO-FEATURES

(75) Inventors: Hou Tee Ng, Palo Alto, CA (US); Alfred I-Tsung Pan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 837 days.

(21) Appl. No.: 11/496,939

(22) Filed: Jul. 31, 2006

(65) Prior Publication Data
US 2008/0024752 A1 Jan. 31, 2008

(51) Int. Cl.
*G03B 27/02* (2006.01)
(52) U.S. Cl. .................. 427/126.3; 427/97.1
(58) Field of Classification Search ............ 427/278, 427/255.33, 96.1, 97.1, 98.3, 126.3
See application file for complete search history.

(56) References Cited

U.S. PATENT DOCUMENTS

| | | | |
|---|---|---|---|
| 6,852,623 B2 * | 2/2005 | Park et al. | 438/663 |
| 6,878,184 B1 * | 4/2005 | Rockenberger et al. | 75/343 |
| 6,951,666 B2 | 10/2005 | Kodas et al. | |
| 2003/0148024 A1 * | 8/2003 | Kodas et al. | 427/125 |
| 2004/0013982 A1 | 1/2004 | Jacobson et al. | |
| 2005/0074589 A1 * | 4/2005 | Pan et al. | 428/206 |
| 2005/0126338 A1 * | 6/2005 | Yadav | 75/255 |
| 2006/0001726 A1 | 1/2006 | Kodas et al. | |
| 2006/0284171 A1 * | 12/2006 | Levy et al. | 257/43 |
| 2007/0001581 A1 * | 1/2007 | Stasiak et al. | 313/498 |
| 2008/0023698 A1 * | 1/2008 | Li et al. | 257/43 |

FOREIGN PATENT DOCUMENTS
CN 1330026 * 1/2002

OTHER PUBLICATIONS
Nano Letters vol. 5, 12(2005)2408-2413.*

* cited by examiner

*Primary Examiner* — Timothy Meeks
*Assistant Examiner* — Tabassom Tadayyon Eslami

(57) ABSTRACT

Contact printing can be used to form electrically active micro-features on a substrate. An ink formulation containing an oxide precursor is used to form the micro-features, which are heat cured to form oxides. Various precursors are illustrated which can be used to form conducting, insulating, and semiconductor micro-features.

16 Claims, 5 Drawing Sheets

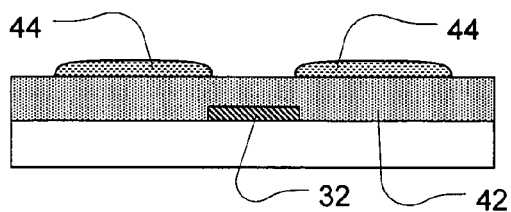
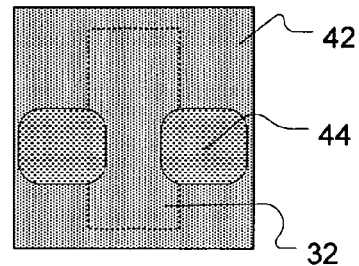
FIG. 4(e)　　　FIG. 5(e)
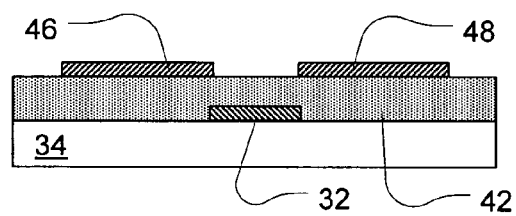
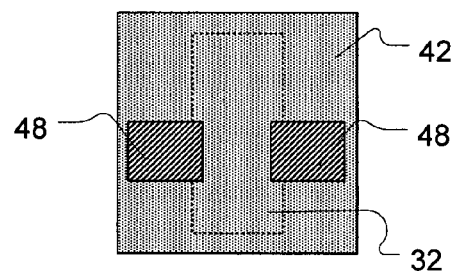
FIG. 4(f)　　　FIG. 5(f)
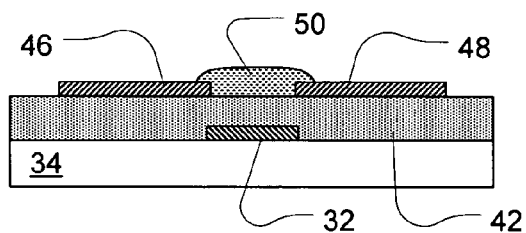
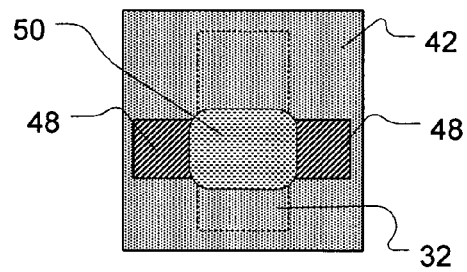
FIG. 4(g)　　　FIG. 5(g)
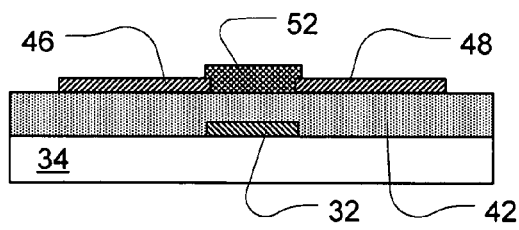
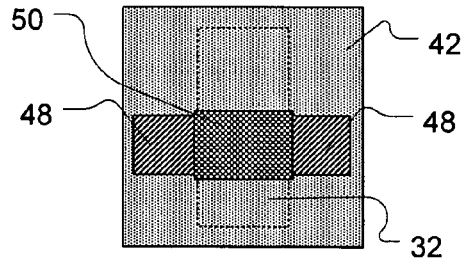
FIG. 4(h)　　　FIG. 5(h)

CONTACT PRINTING OXIDE-BASED ELECTRICALLY ACTIVE MICRO-FEATURES

BACKGROUND OF THE INVENTION

Fabrication of electronic components is principally performed on semiconductor substrates, such as single crystal silicon wafers. Processing steps involved in fabricating devices on a semiconductor wafer often entail the use of high temperatures, vacuum chambers, and highly reactive chemicals. Semiconductor wafer fabrication facilities are thus both expensive to build and operate.

The semiconductor substrate is a large portion of the cost of electronic devices, so cheaper substrates are desired. Unfortunately, the high temperatures and reactive chemicals typical of semiconductor wafer processing places limits on the choices of materials which can be used. For example, plastic substrates, while inexpensive, cannot handle high processing temperatures or certain chemical processes. Fabrication of devices on a plastic substrate is highly desired, for example, to enable lightweight, lower cost electronic displays. While some techniques for fabricating devices on plastic substrates are known, there is room for improvement in these techniques and the quality of devices fabricated. For example, finding materials which can provide high quality electrically active materials and be processed at temperatures compatible with plastic substrates has proven elusive.

Another factor affecting the cost of fabricating electronic devices is the complexity of the photolithographic processes used to pattern the various features of the devices. Recent efforts have focused on developing techniques to directly print the features of devices, for example, using ink-jet printing. While much success has been obtained with such approaches, printing of micro-features, for example having dimensions of 10 micrometers or smaller, has also proven elusive. Moreover, it is difficult to find suitable materials which can be applied with various printing processes. Accordingly, achieving devices having size or properties comparable to devices manufactured by semiconductor wafer processing have proven challenging.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIGS. 4(a) to 4(h) is a side view of a thin film transistor being fabricated on a substrate in accordance with an embodiment of the present invention; and FIGS. 5(a) to 5(h) is a top view of the thin film transistor of FIGS. 4(a) to 4(h), respectively.

DETAILED DESCRIPTION OF THE PREFERRED EMBODIMENT(S)

Figure 1A:
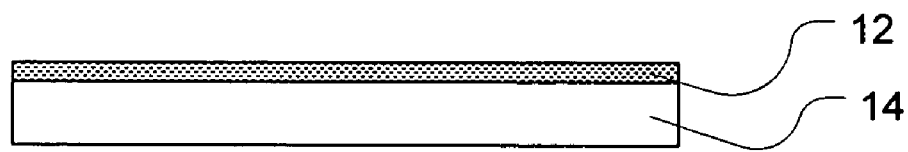
FIGS. 1(a) to 1(c) is an illustration of a sequence of operations for forming electrically active micro-features on a substrate in accordance with one exemplary embodiment of the present invention.

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a precursor" includes reference to one or more of such materials.

The term "micro feature" refers to a feature having a size in at least one dimension (other than thickness) of 10 micrometers or less. In other words, the width in at least one dimension is 10 micrometers or less.

The term "heat curing" refers to the process of converting a liquid or liquid dispersion, such as for example ink, to a solid by exposing it to heat.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

One embodiment of the present invention includes a method of forming electrically active zinc oxide micro-features on a substrate. Method steps include forming a plurality of micro-features on a substrate by contact printing an ink formulation on the substrate using a shim and heat curing the micro-features at a suitable temperature to convert the zinc oxide precursor to zinc oxide. The ink formulation can comprise a zinc oxide precursor. For example, the method can include forming the micro-features by contact printing, for example, using gravure or micro-gravure printing. Ink may be introduced onto the substrate directly, or onto a shim, and is applied to the substrate by placing the shim into contact with the substrate. The formed micro-features are then heat cured at a suitable temperature to react the oxide precursor to form the desired material. The finished micro-features can be active electronic materials, such as insulating, conducting, semi-conducting, and doped semi-conducting features.

In another more detailed embodiment, a system for forming electrically active micro-features on a substrate can comprise a shim having a plurality of recessed areas to define a plurality of micro-features, a supply of ink, means for contacting the shim to a substrate in the presence of the ink to form a plurality of micro-features on the substrate from the ink; and means for heat curing the plurality of micro-features at a temperature between 60° C. and 300° C. to form an oxide. The supply of ink can comprise a liquid vehicle and an oxide precursor.

Turning to the ink formulation in further detail, the ink formulation may include a liquid vehicle and an oxide precursor. The liquid vehicle may include, for example, water, water-soluble polyvinyl alcohol, cellulose acetate, or polymethyl acrylate. Other liquid vehicle components can also be used, as are generally know in the ink-jet printing arts.

The oxide precursor may include a precursor compound which, upon heat treatment at ambient pressure, forms an oxide compound. For example, the oxide precursor can be a metal salt, such as salts of aluminum, copper, titanium, nickel, zinc, or combinations thereof. Aluminum precursors can include aluminum acetate, aluminum acrylate, aluminum butoxide, aluminum (III) ethoxide, aluminum hexafluoropentanedionate, aluminum isopropoxide, aluminum nitrate, and other aluminum organometallics. Electrically conductive features can, for example, be formed from aluminum, copper, and alloys thereof.

Metal oxides are desirable for forming these micro-features because they are stable at room temperature and ambient pressure. Metal oxides can also be easily etched using weak acid or base solutions, making them easier to work with than typical semiconductor materials such as silicon, gallium arsenide, and indium phosphide.

As a particular example, the ink formulation can include a zinc oxide precursor to enable formation of zinc oxide micro-features upon curing. Zinc oxide is a desirable material, since it is a semiconductor and can be doped to form active electronic devices. For example, using techniques as disclosed herein, single crystal zinc oxide nanowires of about 100 micrometer width have been formed on a silicon substrate. X-ray diffraction measurements of the resulting features showed a single dominant peak suggesting preferential alignment of the zinc oxide nanostructures on the substrate. The zinc oxide precursor can include a zinc compound, or even more particularly a zinc salt. For example, the zinc oxide precursor may include zinc nitrate, zinc acetate, zinc carbonate, zinc acetylacetonate, zinc (II) acrylate, zinc chloride, zinc bromide, zinc citrate, zinc tert-butoxide, zinc cyclohexanebutyrate, zinc diethyldithiocarbamate, zinc gluconate, and combinations thereof.

The ink formulation may also include a dopant to allow N-doped or P-doped active features, such as in a transistor. For example zinc analogs which include elemental compositions, such as aluminum, boron, fluorine, arsenic can serve as the dopant for zinc oxide. Zinc analogs can include zinc arsenate, zinc borate, zinc molybdate, zinc phosphate, zinc phosphide, zinc selenate, zinc sulphate, zinc (II) p-toluenesulfonate, and combinations thereof.

Insulating micro-features can be formed by ink formulations which include an insulating oxide precursor. An insulating oxide precursor reacts during heat curing to form an insulating oxide, such as silicon oxide, zirconium oxide, hafnium oxide and the like. Insulating oxide precursors can include silicon (IV) acetate, silicon iodine, hafnium acetylacetonate, hafnium ethoxide, hafnium dinitrate oxide, hafnium pentanedionate.

It has been found when using a zinc oxide precursor that it is desirable to provide an ink formulation wherein the zinc precursor has a concentration of 1 wt % or greater to help maintain integrity of the features. In one embodiment, for zinc oxide precursors such as those derived from zinc salts, the concentrations can be typically from about 0.01 mM to 500 mM (milli-molar).

The ink formulation may also include a surfactant. For example, surfactants can include polyethylene glycols, glycerine esters, ethoxylated fatty amines, alkyl phenol ethoxylates, sorbitan esters, PEG fatty acid esters, ethoxylated sorbitan esters, ethoxylated alcohols, linear alcohol ethoxylates, sodium dodecylsulfate, sodium deoxychlorate, N-Lauroyl-sarcosine sodium salt, cetyltrimethylammonium bromide, ammonium citrate, and combinations thereof. The surfactant can be selected to control crystal morphology during curing, for example to help preferentially grow single crystal, poly crystal, or amorphous features.

In accordance with another embodiment, the ink formulations can also include a weak base or a weak acid to dynamically tune the basicity or acidity of the final formulation. For example, weak base can include organic amines, metal hydroxides, ammonium hydroxide, and combinations thereof. Weak acids can include low concentration hydrochloric acid, sulphuric acid, citric acid, nitric acid, and combinations thereof. These weak bases or acids can play a role when formation of oxide is facilitated by a chemical reaction.

Crystal growth formation during curing can be enhanced by including nano particulates. For example, oxide nano particulates can help to enhance polycrystalline growth during heat curing. Nano particulates can be the same material as the oxide to be formed (e.g., ink formulation includes nano particulates of zinc oxide and zinc oxide precursor), although different nano particulates may also be used. Specific nano particulates can include zinc oxide, titanium oxide, aluminum oxide, tin oxide, indium oxide, indium tin oxide, gallium oxide, gallium tin oxide, and combinations thereof. Nano particulates can have dimensions of about 5 nanometers to 10 micrometers. When printing micro-features, the nanoparticles should be small enough so that the micro feature can be formed as defined herein, i.e., less than 10 micrometers in width along at least one dimension other than thickness, and thus, nanoparticles of 5 micrometers or less or even 2 micrometers or less can preferred for use.

Turning attention to heat curing, various means for heat curing can be used. For example, heating can be provided by heater bars, heat lamps, heating irons and plates, forced heated air, ovens, and other known sources. Heat curing is performed at a suitable temperature to react the features to form an oxide. The heat curing is performed at a temperature above the decomposition temperature for the oxide precursor and below a temperature at which that substrate will be adversely affected (e.g. mechanical integrity or electronic properties). For example, various formulations described herein have been found to react at temperatures between about 40° C. and 350° C., and in particular, temperatures between about 60° C. and 300° C.

Lower temperatures are desirable because it allows the use of a wider variety of substrates. For example, while substrates of silicon, silicon on insulator, II-VI materials, III-V materials, anodized metal and sapphire can be used, these substrates are resistant to high temperatures. Lower temperature processing is particularly desirable when the substrate is a glass, plastic or polymer material having a relatively low melting point. For example, using the low temperature formation, e.g., less than 120° C., zinc oxide features can be formed on plastics such as polyester, polycarbonate, imidized polymeric film, polyethylene terephthalate (PET), and polyethersulfone (PES).

In one embodiment, heat curing can be performed in a reducing atmosphere, such as using forming gases or a combination of hydrogen and inert gases or other known reducing atmospheres. For example, when forming micro-features from metal salt precursors in the presence of a reducing atmosphere, their oxides could be suppressed during the heat curing steps.

Heat curing can be performed before removal or after removal of the shim. If heat curing is performed before removal of the shim, it is desirable to maintain the temperature below the decomposition temperature of the shim. For example, for a shim made of poly dimethylsiloxane, it is desirable to maintain the curing temperature below about 300° C. A pre-curing step can also be performed before removal of the shim, for example, to concentrate the ink or to form intermediate structures within the features.

Turning attention to the contact printing, various means for contacting the shim to the substrate are possible. For example, printing can be performed by gravure or micro-gravure printing. Other mechanical mechanisms, e.g., presses and the like, for contacting and pressing the shim onto a substrate are also known in the art. The shim may be flat or curved, for example mounted on a printing drum. The shim can include a plurality of recessed areas to define the features. The shim can include features having a variety of length scales. For example, features may range from the millimeter to the nanometer range. More particularly, features may include nanowires or nanorods having dimensions of about 100 to about 1000 nanometers, microwires or microrods having dimensions of about 1 micrometer to about 1000 micrometers, and large scale features having dimensions of about 1 millimeter to about 10 millimeters. Features may also include films of varying areas and thicknesses. Various ways of fabricating a shim are known in the art, including using etching, molding, photolithography, and similar processes and will not be discussed further.

Figure 1B:
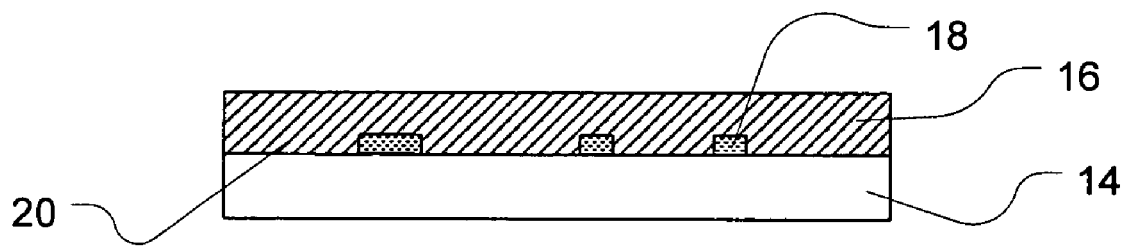
Figure 1C:
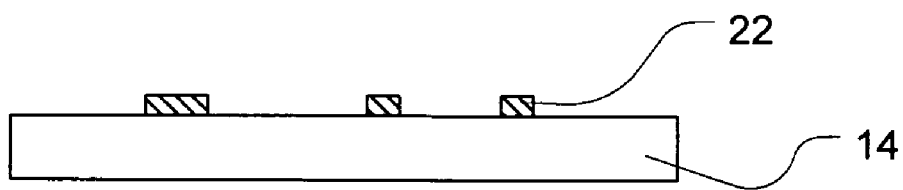

FIGS. 1(a) to 1(c) illustrates a sequence of operations for forming electrically active features on a substrate in accordance with one exemplary embodiment of the present invention. As shown in FIG. 1(a), a layer of ink 12 is introduced onto the substrate 14. Ink can be applied to the substrate, for example, by jetting, dip-coating, spin-coating, doctor blade-coating, etc. The shim 16 is brought into contact with the substrate, and ink remains captured in the recessed areas 18 of the shim as shown in FIG. 1(b). The raised areas 20 of the shim displace ink from areas not corresponding to the micro-features. Without being limiting, for flexible substrates, a hard shim may be desirable because it helps to flatten the substrate, smooth possible surface unevenness and provide more even formation of the micro-features. For hard substrates, soft or flexible shims can be used. For a soft substrate, a flexible or a hard shim can be used.

The shim is removed, and the micro-features 22 cured. As mentioned above, the micro-features can be partially or completely cured before removing the shim. The sequence of steps can be repeated to place additional micro-features or materials onto the substrate to build up an electronic device as discussed further below.

Depending on the particular precursors used, the final features 22 may differ in size from recessed 18 areas in the shim 16. For example, the final features may be reduced in size due to decomposition or evaporation of components within the ink formulation. Accordingly, the recessed areas of the shim can be increased size to compensate for this shrinkage.

As an alternative, rather than coating the entire substrate with ink, ink may be placed at specific locations on the substrate corresponding approximately to the dimensions of the features. For example, relatively low resolution printing techniques may be used to place the ink, and then high resolution gravure contract printing used to form the features as described above.

Figure 2A:
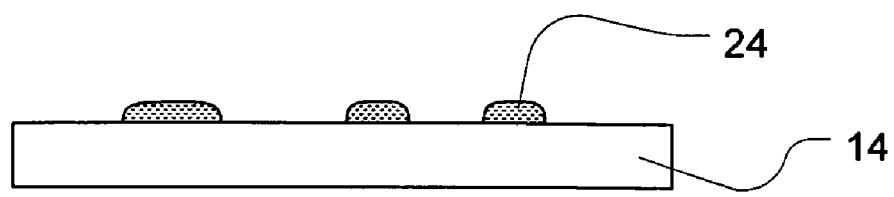
FIGS. 2(a) to 2(c) is an illustration of another sequence of operations for forming electrically active features on a substrate in accordance with an alternate embodiment of the present invention.
Figure 2B:
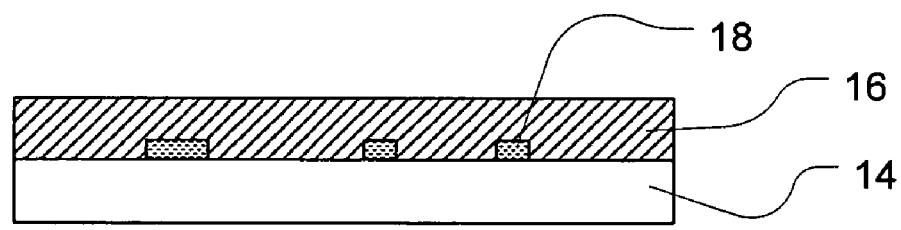
Figure 2C:
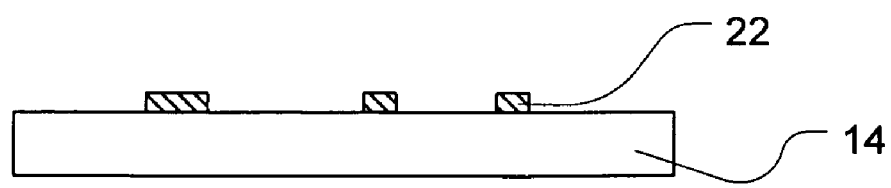

FIGS. 2(a) to 2(c) illustrates an alternate sequence of processing steps in accordance with another embodiment of the present invention, where in FIG. 2(a) ink has been jetted onto the substrate to form proto-features 24, the proto-features being slightly larger in dimension than the desired features. The features 22 are then formed using the shim 16 as described above as shown in FIG. 1(b) and FIG. 1(c).

Figure 3A:
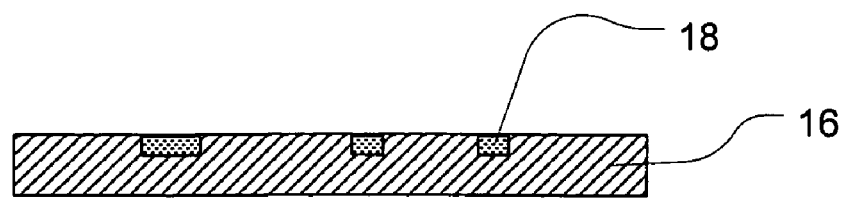
FIGS. 3(a) to 3(c) is an illustration of another sequence of operations for forming electrically active features on a substrate in accordance with another alternate embodiment of the present invention.
Figure 3B:
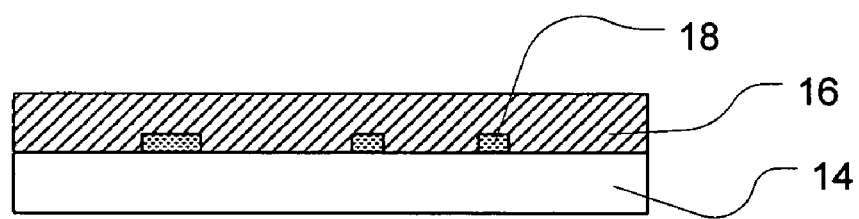
Figure 3C:
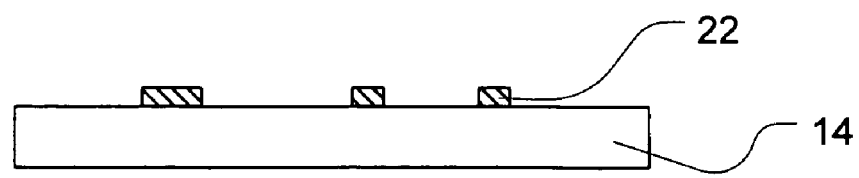
Figure 4A:
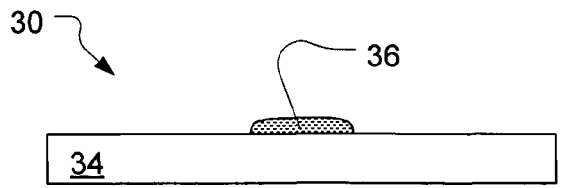
Figure 5A:
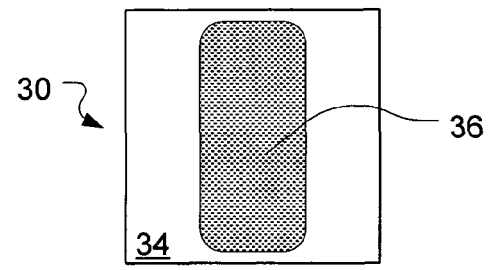
Figure 4B:
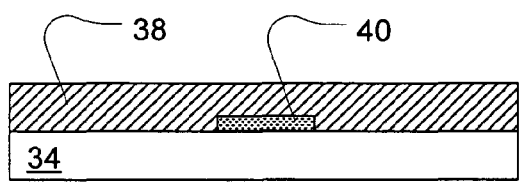
Figure 5B:
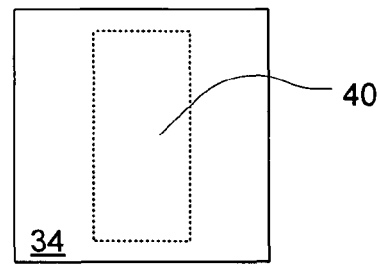
Figure 4C:
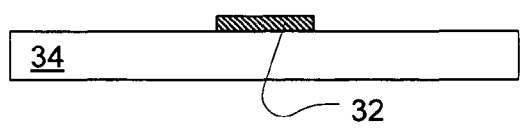
Figure 5C:
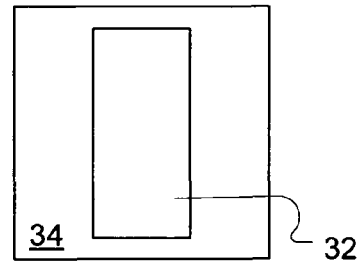
Figure 4D:
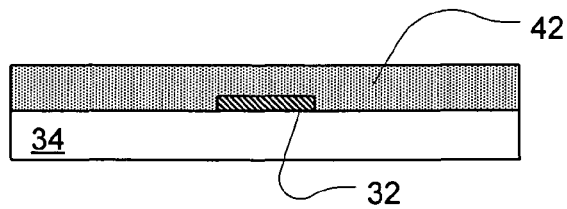
Figure 5D:
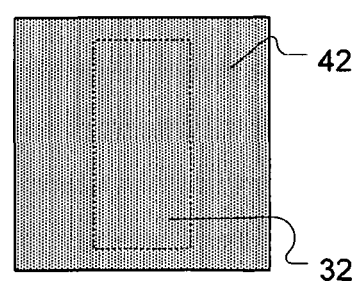

Contact printing can also be formed by placing ink on the shim, and then bringing the shim into contact with the substrate. FIG. 3 illustrates an alternate sequence of operations for forming electrically active features on a substrate in accordance with another embodiment of the present invention. In FIG. 3(a), ink is introduced into the recess 18 of the shim. Ink can be applied to the shim, for example by jetting, dip-coating, spin-coating, doctor blade coating, etc. Additionally, though the ink is shown in FIG. 3(a) as being contained only in the recesses of the shim, excess ink can also be applied more generally to the shim surface, as it can be forcibly removed therefrom upon contact between the shim and the substrate, similarly as with respect to FIGS. 1(a) to 1(c). Returning to FIG. 3(b), the shim is brought into contact with the substrate 14 to transfer ink from the recessed areas of the shim onto the substrate. Light pressure can be applied to the shim, for example, in the range of 1 to 5 PSI, to help transfer the ink to the substrate. A releasing agent can also be applied to the shim prior to inking. The features 22 are cured, either before or after removal of the shim, and are shown in finished form in FIG. 3(c). As noted above, additional operations of pre-curing the ink formulation before or after placing the shim in contact with the substrate can also be performed. For example, pre-curing before placing the shim in contact with the substrate can be used to adjust the viscosity of the ink formulation to facilitate transfer to the substrate.

Fabrication of an electronic device will now be illustrated in conjunction with FIGS. 4(a) to 4(h) and FIGS. 5(a) to 5(h). FIG. 4 provides a series of side views of a thin film transistor 30 fabricated using a process in accordance with an embodiment of the present invention, and FIG. 5 provides a corresponding series of top views of the transistor. The first features formed is a conducting gate electrode 32 formed on the substrate 34. The conducting gate electrode can be formed by printing a proto-feature 36 using an ink formulation having a conductive oxide precursor which cures to form a conductive oxide feature. The proto-feature is further defined by contact printing using a shim 38. The shim further defines the proto-feature by confining the ink 40 to the recessed area of the shim. Excess ink is squeezed out from between the shim and the substrate. A small film of ink may remain on the substrate, and be removed during a later processing step, for example by oxygen plasma or rapid solution-based etching. Heat curing causes the ink to react, forming the gate electrode 32.

An insulating oxide layer 42 can be formed over the gate using an ink formulation having an insulating oxide precursor. The ink can be applied to the substrate using spin-coating, gravure printing, or doctor-blade coating to provide a uniform and conformal layer. The ink is cured to form the insulating oxide.

Next, the conducting source and conducting drain electrodes are formed using similar processing steps as for forming the gate electrode. Proto-features 44 for the source and drain are printed, further defined by contact printing with the shim and cured to form the source electrode 46 and drain electrode 48.

In this embodiment, the semiconductor channel is then formed by printing a proto-feature 50 using an ink formulation having an oxide precursor, such as zinc oxide, and possibly a dopant. The proto-feature is then defined by contact printing and cured to form the semiconductor channel 52 and complete the electronic device.

Although a single device has been illustrated, it should be appreciated that multiple electronic devices and interconnections between the devices can be simultaneously fabricated using the process as just described to produce a complete electronic circuit.

Summarizing, embodiments of the present invention provide a technique for simultaneously forming active electronic features with multiple length scales, ranging from nanometer to millimeter ranges. The features can include electrically conducting, semiconducting, and insulating structures, enabling the formation of devices and integrated circuits. Features can be formed using contact printing with an ink having precursors which can be cured at relatively low temperatures to form the desired materials. This enables substrates like glass and plastic to be used. Various precursors for forming semiconductor, doped semiconductor, conductor, and insulator type features have been described.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of forming electrically active zinc oxide micro-features on a substrate, the method comprising:
    forming a plurality of micro-features on a substrate by introducing an ink formulation on the substrate, said ink formulation comprising a zinc oxide precursor;
    placing a shim in contact with the substrate wherein raised areas of the shim displace the ink formulation from areas not corresponding to the micro-features; and
    heat curing the micro-features at a suitable temperature to convert the zinc oxide precursor to zinc oxide.

2. The method of claim 1, further comprising removing the shim prior to heat curing.

3. The method of claim 1, further comprising applying or removing the shim during or after heat curing.

4. The method of claim 1, wherein the heat curing is performed at ambient pressure.

5. The method of claim 1, wherein the heat curing is performed in a reducing atmosphere.

6. The method of claim 1, wherein the heat curing comprises heating at a temperature from about 60° C. and about 300° C.

7. The method of claim 1, wherein the heat curing comprises heating at a temperature from about 40° C. and about 350° C.

8. The method of claim 1, wherein the substrate is a plastic.

9. The method of claim 1, wherein the zinc oxide precursor is a zinc compound.

10. The method of claim 9, wherein the zinc compound is selected from the group of zinc nitrate, zinc acetate, zinc carbonate, zinc acetylacetonate, zinc (II) acrylate, zinc chloride, zinc bromide, zinc citrate, zinc tert-butoxide, zinc cyclohexanebutyrate, zinc diethyldithiocarbamate, zinc gluconate, and combinations thereof.

11. The method of claim 1, wherein the ink formulation further comprises nano particulates dispersed in therein.

12. The method of claim 11, wherein the nano particulates are selected from the group of aluminum oxide, titanium oxide, zinc oxide, tin oxide, indium oxide, indium tin oxide, gallium oxide, gallium tin oxide, and combinations thereof.

13. The method of claim 1, wherein the ink formulation further comprises a dopant selected from the group of zinc arsenate, zinc borate, zinc molybdate, zinc phosphate, zinc phosphide, zinc selenate, zinc sulphate, zinc (II) p-toluenesulfonate, and combinations thereof.

14. The method of claim 1, wherein the ink formulation further comprises a surfactant selected to control crystal growth morphology during curing.

15. The method of claim 1, further comprising the step of forming at least one feature having a size in at least one dimension in excess of 1 millimeter.

16. The method of claim 1, wherein introducing the layer of the ink formulation onto the substrate is performed by jetting, dip-coating, spin-coating, or doctor blade-coating.

* * * * *